Aug. 26, 1958 K. R. HAMANN 2,849,540

BINAURAL SYSTEM

Filed June 17, 1954 5 Sheets-Sheet 1

*INVENTOR.*
KENNETH R. HAMANN
*BY*
Woodling and Krost,
Attys

INVENTOR.
KENNETH R. HAMANN
BY
Woodling and Krost,
Attys.

INVENTOR.
KENNTH R. HAMANN
BY Woodling and Krost,
Attys.

INVENTOR.
KENNETH R. HAMANN
BY Woodling and Krost,
Attys.

Aug. 26, 1958 K. R. HAMANN 2,849,540

BINAURAL SYSTEM

Filed June 17, 1954 5 Sheets-Sheet 5

INVENTOR.
KENNETH R. HAMANN

BY Woodling and Krost
Attys.

United States Patent Office 2,849,540

Patented Aug. 26, 1958

2,849,540

BINAURAL SYSTEM

Kenneth R. Hamann, Parkview, Ohio

Application June 17, 1954, Serial No. 437,545

12 Claims. (Cl. 179—100.1)

The invention relates in general to multiple signal audio systems and more particularly to a simplified binaural recording and reproducing system.

The ultimate goal of the discerning audio engineer is to devise methods of bringing original sounds into the living room and libraries of the average man. The average man has been acquainted with only mediocre sound reproduction from only AM radio and phonograph recordings. The average AM radio receiver produces sound from about 100 cycles to 4500 cycles at best, and the phonograph of not too long ago did but very little better. Many techniques and systems have been devised for producing high quality sound on radio, television, and phonographs. To date the best methods of more natural reproduction of music in the laboratories at least are the high quality tape recorder and binaural records. This latter system uses a special two track record requiring a two headed tone arm and rather precise adjustments to give three dimensional or binaural sound through use of two amplifiers and loud speakers. This requires special equipment, however, which is practically limited to use with the special two track records.

An object of the invention therefore is to produce a recording and reproducing binaural sound system that will eliminate the complexity of both the recording and reproducing equipment.

Another object of the invention is to devise a binaural recording system wherein dual track records are not required.

Another object of the invention is to provide a binaural system wherein a two headed playback or recording head is not needed.

Another object of the invention is to provide a binaural recording and reproducing system which may be usable on phonographs of any conventional R. P. M. with a normal amount of material recorded on each.

Another object of the invention is to provide a binaural recording system wherein records having a binaural signal recorded thereon may be played with existing playback equipment and still obtain passable quality of the reproduced sound.

Another object of the invention is to provide a binaural system which may be used with either records, tape, or other recording media and wherein single track heads, either playback or recording, may be used with only slight modification.

Another object of the invention is to provide a binaural system using a simple electronic sound splitter which will be small and compact and easily mounted near any existing amplifier-playback equipment.

Another object of the invention is to provide a binaural system which utilizes recording media with only a single track or channel and which can be used with existing equipment.

Another object of the invention is to provide a binaural system wherein the conversion equipment is at a minimum.

Still another object of the invention is to provide a binaural system which eliminates all adjustments of head spacing or tracking.

Other objects and a fuller understanding of this invention may be had by referring to the following description and claims, taken in conjunction with the accompanying drawings, in which:

Figure 1:
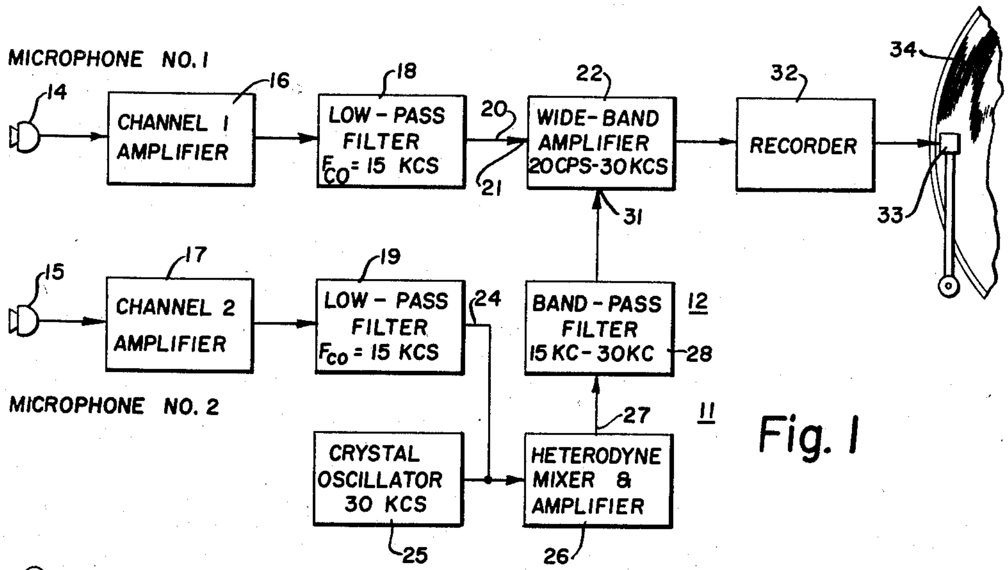
Figure 1 is a schematic block diagram of a binaural recording system.
Figure 2:
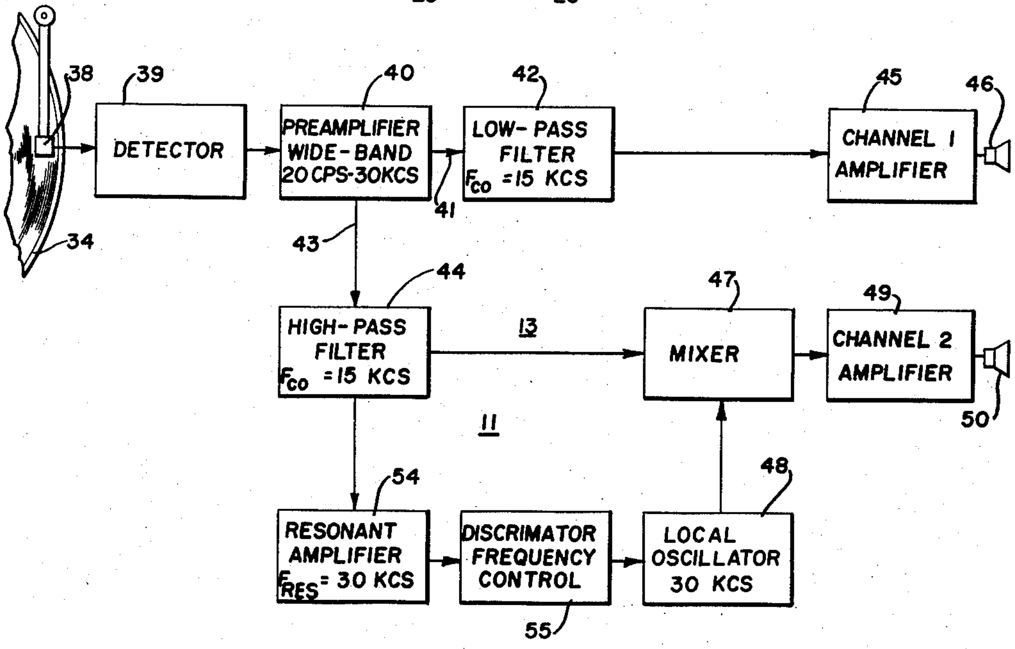
Figure 2 is a schematic block diagram of a binaural reproducing system.

The Figures 1 and 2 show in block diagram form the entire recording and reproducing system 11. The entire system 11 generally includes a recording network 12, shown in Figure 1, and a reproducing network 13, shown in Figure 2. Basically, the system is applicable to any plural number of audio channels, and in this preferred embodiment the plural number of channels has been described as two audio channels. The sound to be recorded is picked up by first and second microphones 14 and 15. These microphones are physically spaced apart at a predetermined distance, for example, ten feet. The signal from each microphone 14 and 15 is amplified by initial amplifiers 16 and 17, respectively. The sound is next passed through low-pass filters 18 and 19, respectively, which removes or attenuates all audio signals above a first frequency. In this preferred embodiment the first frequency is chosen to be 15,000 cycles. The signal from the first channel 20 is fed directly to a first input 21 of a wide-band amplifier 22. The signal from the second channel 24 is combined with a second frequency coming from a tone generator or oscillator 25, which, in this embodiment, is chosen to be 30 kilocycles. The combined signals, that is, the signal from the second channel and the steady tone of 30 kilocycles, are mixed in a heterodyne mixer 26. The output 27 of this mixer 26 is fed through a band-pass filter 28 which passes only the beat note products of that combination from 15 kilocycles to 30 kilocycles. The band-pass filter 28 passes this second signal into a second input 31 of the wide-band amplifier 22. This wide-band amplifier 22 amplifies the superposed first and second signals and feeds them to a recorder 32. The recorder 32 includes a cutter head 33 for recording the two signals in a single track on a record 34 or other recording medium. At the output of the recorder 32 there is the first signal extending from 0 to 15 kilocycles and the second signal from the second channel extending from 15 to 30 kilocycles with a steady 30 kilocycle carrier or tone impressed on it from the oscillator 25. This combined binaural signal and carrier is recorded in a single track on the record 34, tape, or other recording media.

The Figure 2 shows the reproducing end of the system 11, and in this reproducing network 13 a reverse process of separation and demodulation is used to bring two separate channels into two separate loud speakers. The record 34 is driven by a drive means, not shown, and a playback head 38 picks up the 0 to 30 kilocycle signal on the record 34. The playback head 38 may be considered as part of a detector 39 which symbolizes some form of device for changing the signal on the record into an electrical signal. The detector 39 passes the signal to a preamplifier 40 which amplifies the signal to a suitable level and passes it at a first output 41 to a low-pass filter 42. The preamplifier 40 also has a second output 43 to pass the signal to a high-pass filter 44.

The detector 39 is a device which reproduces the first and second signals. The first band or first signal from 0 to 15 kilocycles which originally came from the first channel 20 is amplified directly by a first channel amplifier 45 and passed to a first loud speaker 46. The second band or signal from 15 to 30 kilocycles is combined in a mixer 47 with a locally produced 30 kilocycle signal from a local oscillator 48. The mixed products are fed to a second channel amplifier 49 which cuts off all frequencies above 15 kilocycles and passes the frequency band from 0 to 15 kilocycles to a second loud speaker 50.

The 30 kilocycle frequency existing as a carrier on the record 34 is passed by the high-pass filter 44 through a resonant amplifier 54. The output of this resonant amplifier 54 controls the local oscillator 48 by means of a frequency control discriminator 55. In this way the 30 kilocycle signal on the record 34 is used to stabilize the frequency of the local oscillator 48 in correct frequency relation to the first and second signals despite any variations in speed of the drive means for the record 34 in either the recording network 12 or the reproducing network 13. In this way two separate channels are reproduced in the loud speakers 46 and 50, each with a fidelity 0 to 15 kilocycles, which is adequate for all practical purposes.

Figure 3:
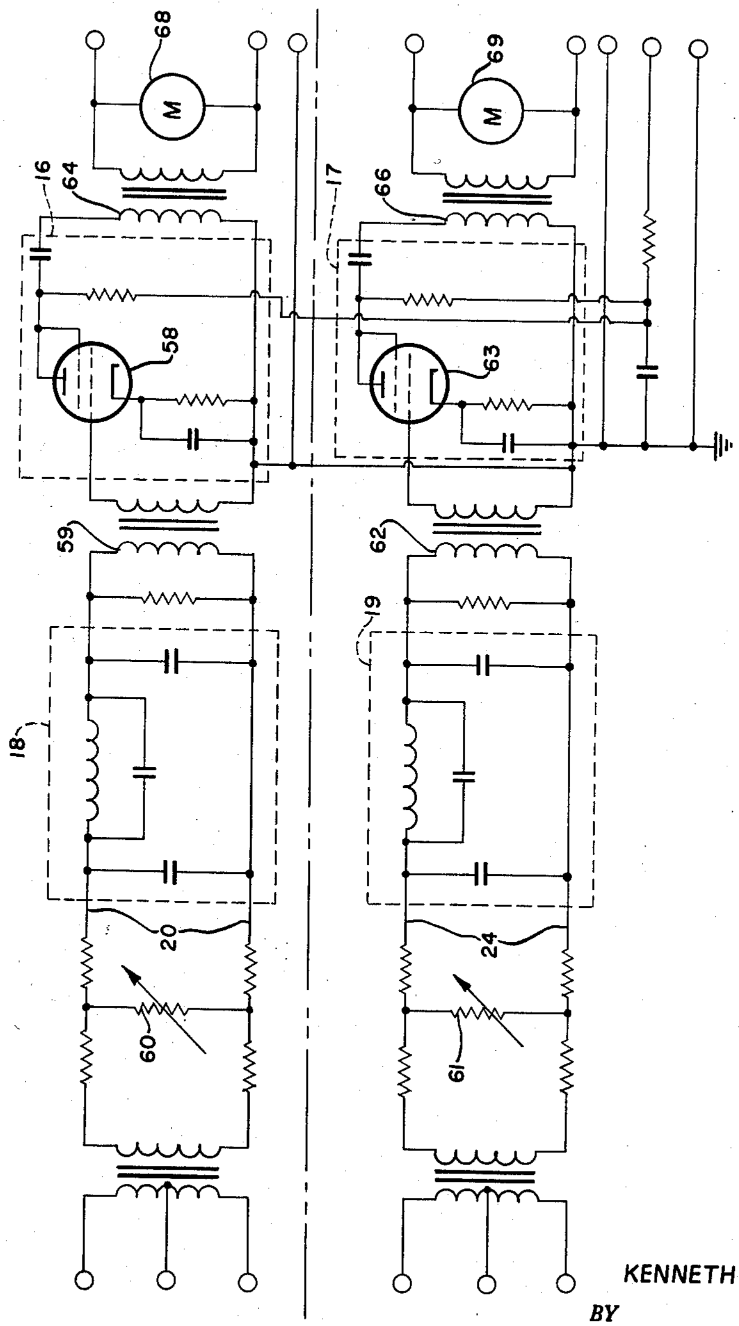
Figure 3 is a schematic diagram showing the components in the initial amplifiers and low-pass filters of the recording network.

The Figure 3 describes in greater detail the components used in the amplifiers 16 and 17 and low-pass filters 18 and 19. The amplifier 16 is in the channel 20 and includes a pentode vacuum tube 58 as a single stage amplifier fed through the matching transformer 59 from the low-pass filter 18. The pentode amplifier 58 makes up the loss in the low-pass filter 18. A gain control 60 is also included at the input to the low-pass filter 18. The Figure 3 also shows the initial stages of the second channel 24 as including a gain control 61, the low-pass filter 19 feeding through a matching transformer 62 to a pentode amplifier 63 in the initial amplifier 17. The first channel from amplifier 16 passes through a matching transformer 64 directly to the input 65 of the wide-band amplifier shown in Figure 6. The output of the second channel 24 from the amplifier 17 passes through a matching transformer 66 to the input 67 of the circuit shown in Figure 4. Also, in Figure 3 voltmeters 68 and 69 may be provided to compare the signal levels in each of the channels.

Figure 4:
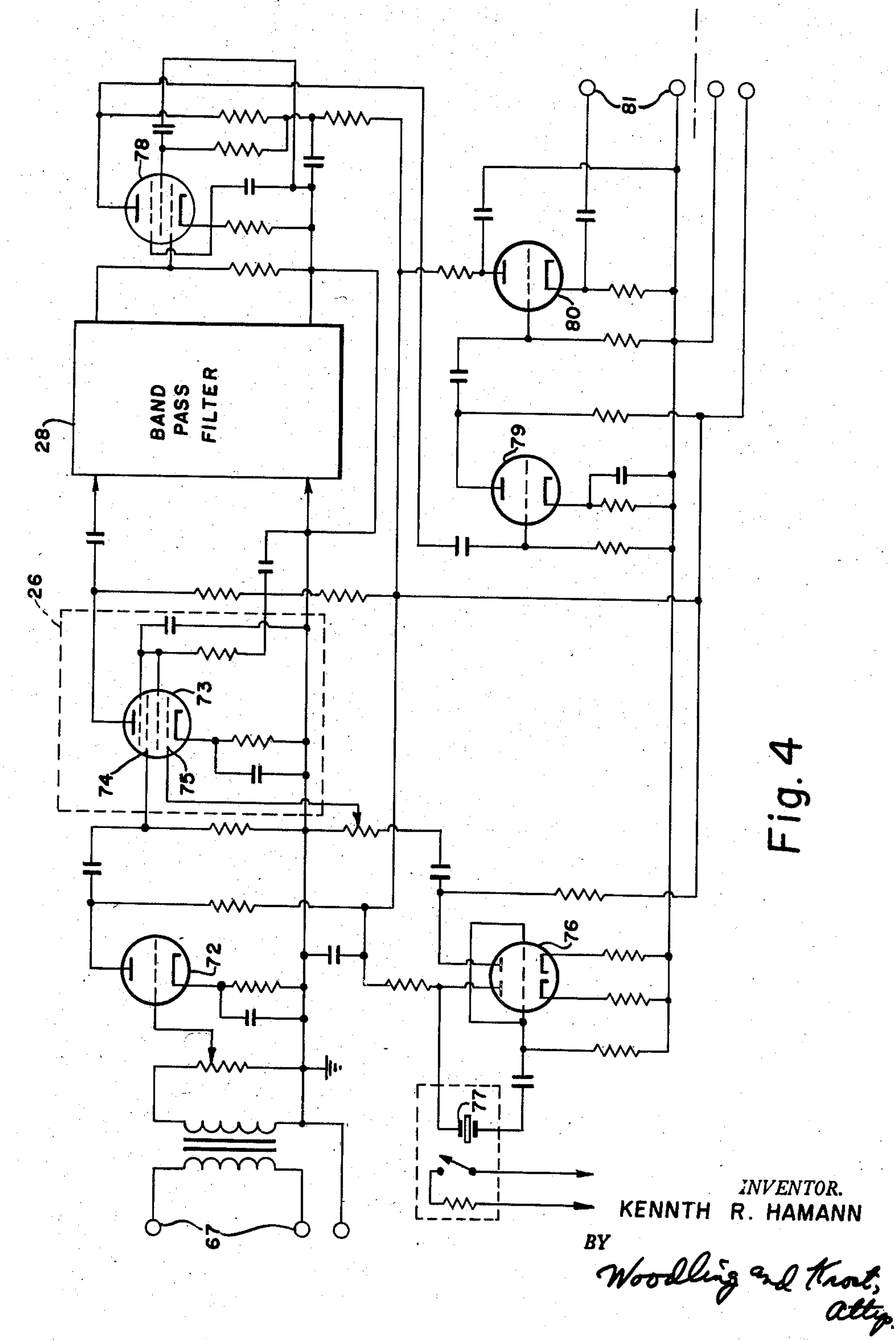
Figure 4 is a schematic diagram showing the components in the mixer section of the recording network.

The circuit of Figure 4 schematically shows the mixer section and band-pass filter of the recording network 12. The input at 67 is applied to a triode amplifier 72 which amplifies the signal to a predetermined level. A mixer tube 73 is provided in the heterodyne mixer 26 and has a first input grid 74 from the amplifier 72. The mixer tube 73 also has a second input grid 75 connected to the output of an oscillator tube 76. The oscillator tube 76 is controlled in frequency by a crystal 77 which in this preferred embodiment is shown as a 30 kilocycle constant signal. The output of the heterodyne mixer 26 is supplied to the band-pass filter 28 which passes its frequencies between 15 and 30 kilocycles. An amplifier tube 78 amplifies this frequency band, and an amplifier 79 amplifies it still further. Another amplifier 80 is provided which is connected as a cathode follower which feeds the next with a low impedance line at the output 81. The output 81 is connected to input 82, shown in Figure 6.

Figure 5:
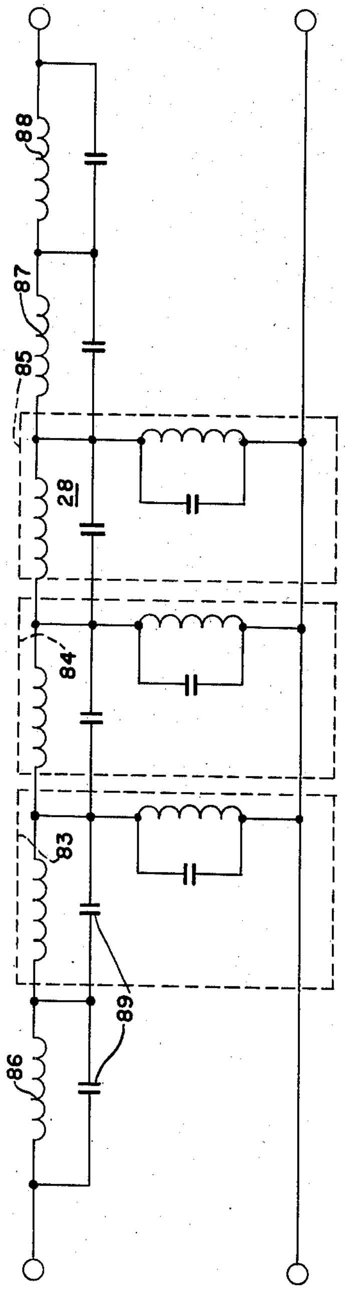
Figure 5 shows the components within the band-pass filter of the recording network.

The band-pass filter 28, shown in Figure 5, preferably includes first, second, and third sections 83, 84, and 85. Also, the filter has a series inductance 86 at the input and two series connected inductances 87 and 88 at the output. Condensers 89 are connected in parallel with each of the inductances to provide the band-pass characteristics. The use of the three sections plus series inductance input and output on the entire filter provide the filter 28 with the required sharp cut-off characteristics for band-pass only from 15 kilocycles to 30 kilocycles. The band-pass filter 28 may be simplified if such a sharp cut-off is not needed in the particular binaural system desired.

Figure 6:
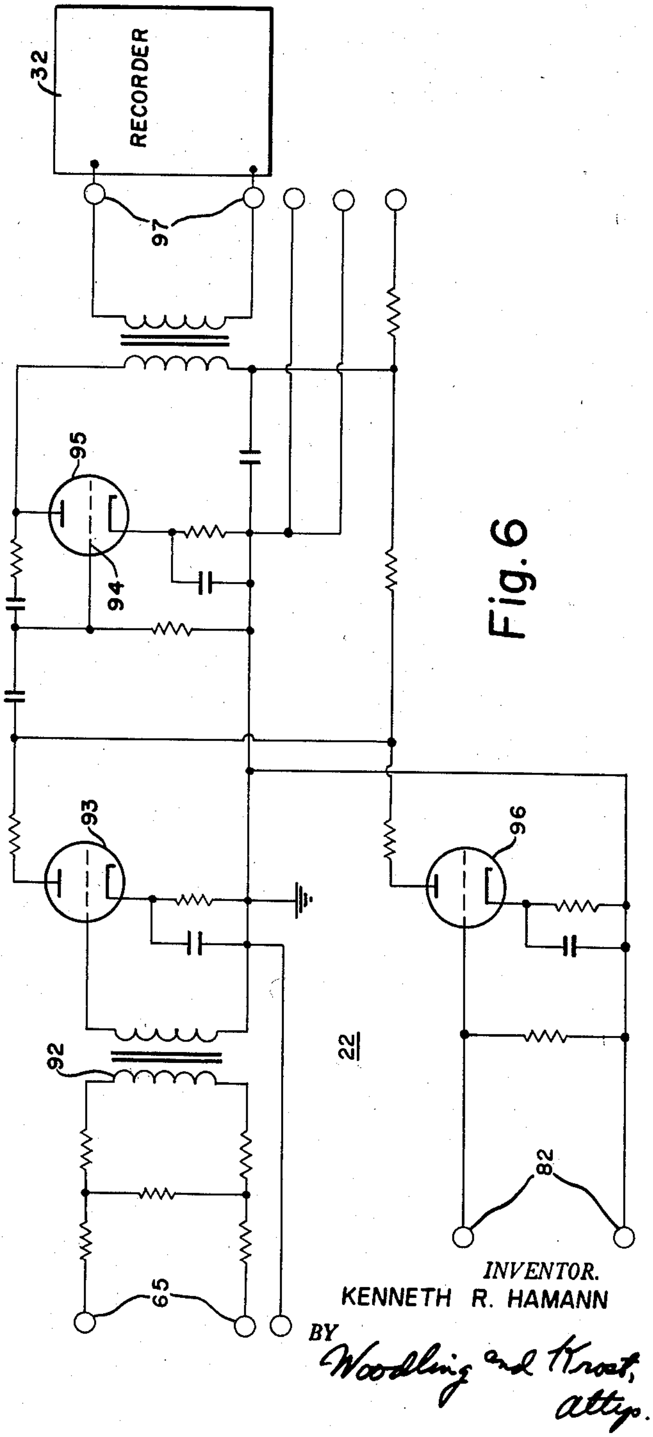
Figure 6 shows a schematic diagram of the components in the wide-band amplifier of the recording network.

The Figure 6 illustrates the components in the wide-band amplifier 22. The input at 65 is fed through a matching transformer 92 to a triode amplifier 93 and from there to a grid 94 of another amplifier tube 95. At the same time the input at 82 which is a 15 to 30 kilocycle signal is amplified by a triode amplifier 96 and also applied to the same grid 94. Thus, the grid 94 has the first signal from 0 to 15 kilocycles and superimposed thereon the second signal from 15 to 30 kilocycles. The amplifier 95 is a wide-band amplifier which amplifies this 30 kilocycle band and passes it to the output 97 which is connected to the recorder 32.

Figure 7:
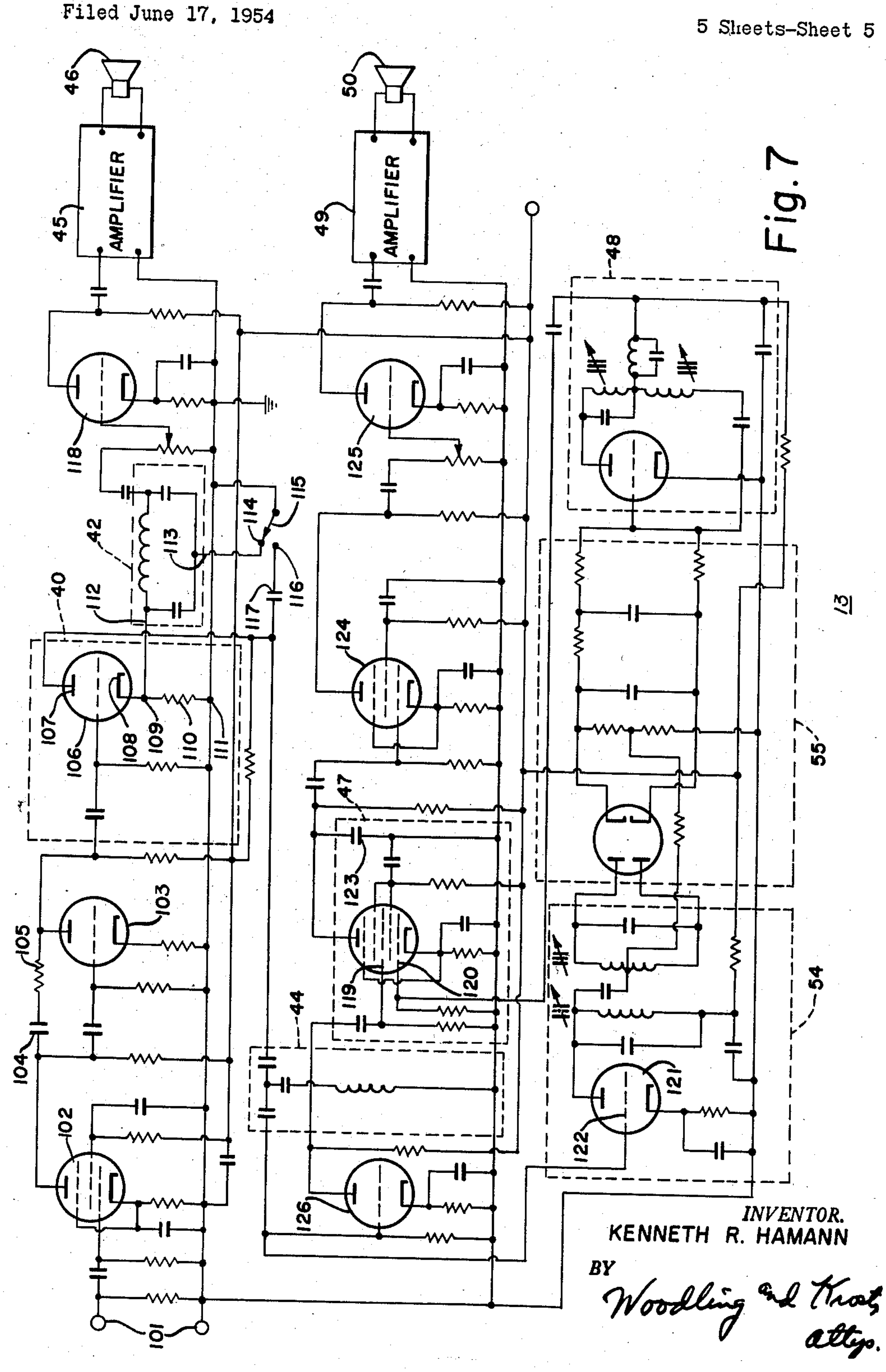
Figure 7 is a schematic diagram of the reproducing network.

The Figure 2 illustrates in block diagram form the reproducing network 13, and Figure 7 illustrates this network 13 with the various components therein. The electrical input from the detector 39 is applied to the input 101, as shown in Figure 7. An amplifier 102 is used to amplify this signal and another amplifier 103 is used as an equalizer amplifier to compensate for the standard recording curve used on records. The condenser 104 and resistor 105 are used to provide this equalization. The signal is next passed to an electronic signal splitter tube 106 which is a part of the preamplifier 40. The signal splitter tube 106 has an anode 107 connected to the high-pass filter 44. The tube 106 also has a cathode 108 connected to a first terminal 109 of an impedance 110. The other terminal 111 of the impedance 110 is connected to the common conductor the the input 101, which conveniently may be grounded. The impedance 110 acts as a cathode follower impedance. The low-pass filter 42 has a first input 112 connected to the terminal 109 and has a second input terminal 113 connected to one contact 114 of a double-throw selector switch 115. The other contact 116 of the switch 115 is connected through a coupling condenser 117 to the anode 107. The output of the low-pass filter 42 is passed to an amplifier tube 118 which makes up the losses in the low-pass filter 42. The amplifier tube 118 passes this first signal to the channel #1 amplifier 45 and then to the loud speaker 46. This low-pass filter 42 passes all frequencies from 0 to 15 kilocycles which will be the first signal. When the selector switch 115 is in the position shown, the signal appearing on the anode 107 of the signal splitter tube 106 is passed by the high-pass filter 44 to an amplifier tube 126, which thus receives all frequencies above 15 kilocycles. The selector switch 115, when in the position shown in the drawing, permits this tube 106 to act as an electronic signal splitter as previously described. When the switch 115 is thrown to the other position, then all signals on the anode 107 are shorted through condenser 117 to ground at terminal 111, and the low-pass filter 42 is disconnected from the ground so as to render it ineffective and thus the tube 106 and amplifier 45 become a single channel full frequency amplifier system handling up to 30 kilocycles.

In normal use as a binaural reproducing system 13, the amplifier tube 126 amplifies the frequencies, which lie between 15 kilocycles and 30 kilocycles, and passes it to the mixer 47 at the input grid 119. The mixer 47 also has a second input grid 120 which is supplied with a signal from the local oscillator 48. This signal from the oscillator 48 is held substantially at 30 kilocycles, but the frequency thereof may change slightly. The frequency is controlled by the frequency control discriminator 55 which is fed by the resonant amplifier 54. The resonant amplifier 54 includes an amplifier tube 121 having a grid 122 connected in parallel with the input to the amplifier 126. Thus, the resonant amplifier 54 takes the constant frequency carrier on the single track record and utilizes this signal as a control to control the frequency of the output signal from the oscillator 48. Thus, if the drive means driving the record 34 in the reproducing network 13 is slightly different than the speed of the drive means initially driving the record 34 in the recording network 12, then this frequency of oscillation of the oscillator 48 will not be exactly 30 kilocycles but will be somewhat different yet still retaining its correct percentile relationship with the first and second signals appearing at the input 101. This is a superior feature of the present invention in that the frequency of the oscillator 48 is automatically corrected for any changes in speed of the drive motor of the record 34 or other variables in the reproducing system 13 or recording system 12.

The 30 kilocycle tone on the input grid 120 mixes with the 15 to 30 kilocycle frequencies on the input grid 119 in the mixer 47 and the heterodyne or beat frequencies appear at the output of this mixer 47. The condenser 123 short circuits the frequencies above 15 kilocycles on this output and therefore only the beat note frequencies from 0 to 15 kilocycles are passed to an amplifier tube 124. This is the channel #2 or second audio signal, and it is amplified still further by amplifier 125 and passed to the channel #2 amplifier 49 and thence to the loud speaker 50.

The previously described recording and reproducing system 11 provides adequate fidelity from 0 to 15 kilocycles on each of two channels represented by the loud speakers 46 and 50. Preferably, these loud speakers would be physically spaced apart ten feet or the same spacing as was provided for the microphones 14 and 15. Thus, the listener would receive binaural sound with full fidelity on each loud speaker 46 and 50.

Tape or wire or other recording median may be used rather than records, and in any case the resonant amplifier 54 and frequency control discriminator 55 will establish the correct frequency of the local oscillator 48 to make certain that in the mixer 47 the correct second frequency tone is mixed with the 15 to 30 kilocycle band width to reproduce correctly the second signal which ultimately appears at the loud speaker 50.

It will be noted that the entire recording and reproducing system utilizes only a single track on the record 34. This single track includes both the first and second audio signals from the microphones 14 and 15 and also includes the 30 kilocycle tone from the crystal oscillator 25 superimposed thereon. There is a full 15 kilocycle frequency range for both channels, and the conversion equipment is kept at a minimum since only one cutter head 33 and stylus is needed, only one playback head 38 and stylus is needed, and therefore there is completely eliminated any required adjustments of head spacing or tracking which necessarily are difficult. The channel splitter 106 is all electronic, and with the switch 115 thrown in a position opposite to that shown in Figure 7, a single channel reproducing system is provided which can be used with existing equipment.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A binaural reproducing system for use with a binaural recording system recording on a recording medium a single track containing first and second superposed audio signals with said first signal occupying a channel between zero and a first frequency and said second signal occupying a channel above said first frequency, and with said single track also containing a substantially constant control frequency signal, said reproducing system including a detector for detecting the first and second signals and said constant control frequency, means to obtain a second control frequency signal controlled by said first control frequency signal, means to heterodyne said second control frequency signal with said second signal to reproduce audio components below said first frequency, a first audio output channel to pass said detected first signal, and a second audio output channel to pass said reproduced audio components.

2. A binaural reproducing system for use with a binaural recording system recording on a recording medium a single track containing first and second superposed audio signals with said first signal occupying a channel between zero and a first frequency and said second signal occupying a channel above said first frequency, and with said single track also containing a substantially constant frequency control signal, said reproducing system including a detector for detecting the first and second signals and said constant tone on said track of said recording medium, means resonant to said substantially constant frequency control signal, oscillator means controlled by said resonant means to reproduce said substantially constant frequency control signal in said reproducing system, means to heterodyne said reproduced control signal with said detected second signal, first and second audio output channels, means to pass said detected first signal to said first audio output channel, and means to pass frequencies less than said first frequency from said heterodyne means to said second audio output channel.

3. A binaural reproducing system for use with a binaural recording system recording on a recording medium a single track containing first and second superposed audio signals each utilizing approximately half the band width, said first signal occupying a channel between zero and a first frequency and said second signal occupying a channel between said first frequency and a second frequency, said reproducing system including a detector for detecting the signals on said recording medium, means connected to said detector to pass said first and second signals, a resonant amplifier connected to receive said second signal and resonant to said second frequency, a frequency control discriminator connected to the output of said resonant amplifier, a local oscillator connected to the output of said discriminator and having an output substantially at said second frequency, means to heterodyne said second signal and the output of said local oscillator, first and second channel amplifiers, said first channel amplifier being connected to pass said first signal, said second channel amplifier being connected to the output of said heterodyning means to pass said second signal, and first and second loud speakers connected respectively to the outputs of said first and second channel amplifiers.

4. A binaural reproducing system for use with a binaural recording system recording on a recording medium a single track containing first and second superposed audio signals each utilizing approximately half the band width, said first signal occupying a channel between zero and a first frequency and said second signal occupying a channel between said first frequency and a second frequency, said reproducing system including a detector device for detecting the signals on said recording medium, low-pass and high-pass filters connected to said detector device passing audio frequencies less than and greater than said first frequency, respectively, a resonant amplifier connected to the output of said high-pass filter and resonant to said second frequency, a frequency control discriminator connected to the output of said resonant amplifier, a local oscillator connected to the output of said discriminator to be controlled thereby, a mixer having input means from said high-pass filter and from said local oscillator, first and second channel amplifiers, said first channel amplifier being connected to said low-pass filter, said second channel amplifier being connected to the output of said mixer, and first and second loud speakers connected respectively to the outputs of said first and second channel amplifiers to reproduce, respectively, said first and second signals.

5. A binaural reproducing network for use with a binaural recording network recording on a recording medium a single track containing first and second superposed audio signals each utilizing approximately half the band width, said first signal occupying between zero and a first frequency and said second signal occupying between said first frequency and a second frequency, said reproducing network including a detector device for detecting the signals on said recording medium, a preamplifier having an input connected to said detector and having an amplification range up to said second frequency, first and second outputs from said preamplifier, a low-pass filter passing signals below said first frequency connected to said first preamplifier output, a high-pass filter passing frequencies above said first frequency connected to said second preamplifier output, a resonant amplifier connected to the output of said high-pass filter and resonant to the second frequency on said track, a frequency control discriminator connected to the output of said resonant amplifier, a local oscillator connected to the output of said discriminator to be controlled thereby in output frequency equal to said second frequency, a mixer having input means from said high-pass filter and from said local oscillator, first and second channel amplifiers, said first channel amplifier being connected to said low-pass filter, said second channel amplifier being connected to the output of said mixer, and first and second loud speakers connected respectively to the outputs of said first and second channel amplifiers to reproduce, respectively, said first and second signals.

6. A binaural reproducing system for use with a binaural recording system recording on a recording medium a single track containing first and second superposed audio signals with said first signal occupying a channel between zero and a first frequency and said second signal occupying a channel above said first frequency, and with said single track also containing a substantially constant control frequency signal, said reproducing system including a thermionic tube signal splitter, anode means, cathode means, and grid means in said tube, means to apply said first and second audio signals to said grid means, impedance means connected to said cathode means, a low-pass filter connected to said impedance means to pass said first signal, and a high-pass filter connected to said anode means to pass said second signal.

7. A binaural reproducing system for use with a binaural recording system recording on a recording medium a single track containing first and second superposed audio signals with said first signal occupying a channel between zero and a first frequency and said second signal occupying a channel above said first frequency, and with said single track also containing a substantially constant control frequency signal, said reproducing system including a thermionic tube signal splitter, anode means, cathode means, and grid means in said tube, means to apply said first and second audio signals to said grid means, impedance means connected to said cathode means, a low-pass filter having one input terminal connected to one end of said impedance means to pass said first signal, a high-pass filter connected to said anode means to pass said second signal, and double-throw switch means alternatively connecting the other end of said impedance means to said anode means and to another input terminal of said low-pass filter.

8. A binaural audio system comprising a recording network and a generally complementary reproducing network, said recording network including first and second audio input channels, both of said audio input channels containing frequencies less than a first frequency, a recording medium, means to amplify and pass to said recording medium on a single track thereon the signal on said first audio input channel as a first signal, means to generate a substantially constant tone, means to heterodyne said constant tone with said frequencies on said second audio input channel to pass to said track on said recording medium a second signal containing frequencies greater than said first frequency; said reproducing network including a detector for detecting the first and second signals and said substantially constant tone on said track of said recording medium, resonant means resonant to said substantially constant tone, oscillator means controlled by said resonant means to reproduce said substantially constant tone in said reproducing network, means to heterodyne said reproduced constant tone with said detected second signal, first and second audio output channels, means to amplify and pass said detected first signal to said first audio output channel, and means to amplify and pass frequencies less than said first frequency from said heterodyne means to said second audio output channel.

9. A binaural audio system comprising a recording system and a generally complementary reproducing system, said recording system including first and second audio input channels to pick up sound binaurally, first and second means to pass audio components from said input channels less than a first frequency, an oscillator generating a signal carrier at a second frequency substantially twice said first frequency, means to heterodyne said second channel signal and said second frequency signal from said oscillator, third means to pass signals between said first and second frequencies and having an input connected to the output of said heterodyning means, amplifier means having first and second inputs, said first and third passing means being connected to said first and second inputs, respectively, of said amplifier means, a recording medium, a recording device having an input connected to the output of said implifier means and recording on said recording medium in a single track said second frequency signal and audio intelligence of a band width up to said second frequency, said reproducing system including a detector for detecting the signals on said recording medium, means connected to said detector to pass said first and second signals, a resonant amplifier connected to receive said second signal and resonant to said second frequency, a frequency control discriminator connected to the output of said resonant amplifier, a local oscillator connected to the output of said discriminator and having an output substantially at said second frequency, means to heterodyne said second signal and the output of said local oscillator, first and second channel amplifiers, said first channel amplifier being connected to pass said first signal, said second channel amplifier being connected to the output of said heterodyning means to pass said second signal, and first and second loud speakers connected respectively to the outputs of said first and second channel amplifiers.

10. A binaural audio system comprising a recording system and a generally complementary reproducing system, said recording system including first and second audio input channels to pick up sound binaurally, first and second audio amplifier means amplifying audio components from said input channels less than a first frequency, an oscillator generating signal carrier at a second frequency substantially twice said first frequency, means to heterodyne said second channel signal and said second frequency signal from said oscillator, a band-pass filter designed to pass signals between said first and second frequencies and having an input connected to the output of said heterodyning means, a wide-band amplifier amplifying up to said second frequency and having first and second inputs, said first audio amplifier means being connected to said first input and said band-pass filter being connected to said second input, a recording medium, a recording device having an input connected to the output of said wide-band amplifier and recording on said recording medium in a single track said second frequency signal and audio intelligence of a band width up to said second frequency; said reproducing system including a detector device for detecting the signal on said recording medium, low-pass and high-pass filters connected to said detector device passing audio frequencies less than and greater than said first frequency, respectively, a resonant amplifier connected to the output of said high-pass filter and resonant to said second frequency, a frequency control discriminator connected to the output of said resonant amplifier, a local oscillator connected to the output of said discriminator to be controlled thereby, a mixer having input means from said high-pass filter and from said local oscillator, first and second channel amplifiers, said first channel amplifier being connected to said low-pass filter, said second channel amplifier being connected to the output of said mixer, and first and second loud speakers connected respectively to the outputs of said first and second channel amplifiers to reproduce, respectively, said first and second signals.

11. A binaural audio system comprising a recording network and a generally complementary reproducing network, said recording network including first and second microphones physically spaced apart to pick up sound binaurally, first and second audio amplifiers connected to said microphones, respectively, a first low-pass filter connected to the output of said first amplifier and passing only audio components less than a first frequency, a second low-pass filter connected to the output of said second amplifier and designed to pass only audio components less than said first frequency, a crystal controlled oscillator generating a signal carrier at a second frequency substantially twice said first frequency and outside the audio range of the human ear, a heterodyne mixer having input means connected to said second low-pass filter and to said crystal controlled oscillator, a band-pass filter designed to pass signals between said first and second frequencies and having and input connected to the output of said heterodyne mixer, a wide-band amplifier amplifying up to said second frequency and having first and second inputs, said first low-pass filter being connected to said first input and said band-pass filter being connected to said second input, a recording medium, a recording device having an input connected to the output of said wide-band amplifier and recording on said recording medium in a single track said second frequency signal and audio intelligence of a band width up to said second frequency; said reproducing network including a detector device for detecting the signal on said recording medium, a preamplifier having an input connected to said detector and having an amplification range up to said second frequency, first and second outputs from said preamplifier, a third low-pass filter passing signals below said first frequency connected to said first preamplifier output, a high-pass filter passing frequencies above said first frequency connected to said second preamplifier output, a resonant amplifier connected to the output of said high-pass filter and resonant to the second frequency carrier signal on said track from said crystal controlled oscillator, a frequency control discriminator connected to the output of said resonant amplifier, a local oscillator connected to the output of said discriminator to be controlled thereby in output frequency equal to said second frequency, a mixer having input means from said high-pass filter and from said local oscillator, first and second channel amplifiers, said first channel amplifier being connected to said third low-pass filter, said second channel amplifier being connected to the output of said mixer, and first and second loud speakers connected respectively to the outputs of said first and second channel amplifiers to reproduce, respectively, said first and second signals.

12. A binaural audio system comprising a recording network and a generally complementary reproducing network; said recording network including first and second microphones physically spaced apart a given distance to pick up sound binaurally, first and second audio amplifiers each having outputs and each having inputs connected to said microphones, respectively, first and second low-pass filters each having outputs and each having inputs connected to the outputs of said first and second amplifiers, respectively, and passing only audio components below fifteen kilocycles, a crystal controlled oscillator having an output and generating thereat a thirty kilocycle signal, a heterodyne mixer having an output and having input means connected to the output of said second low-pass filter and to the output of said crystal controlled oscillator, a band-pass filter having an output and designed to pass fifteen kilocycles to thirty kilocycles and having an input connected to the output of said heterodyne mixer, a wide-band amplifier having an output and amplifying up to thirty kilocycles and having first and second inputs, said first low-pass filter being connected to said first input and said band-pass filter being connected to said second input, a recording medium, a recording device having an input connected to the output of said wide-band amplifier and recording audio intelligence in a single thirty kilocycle track and including said thirty kilocycle signal on said recording medium; said reproducing network including a detector device for detecting the thirty kilocycle track of audio intelligence on said recording medium, an output on said detector device, a preamplifier having an input connected to the output of said detector device and having an amplification range up to thirty kilocycles, first and second outputs from said preamplifier, a third low-pass filter passing audio frequencies below fifteen kilocycles and having an output and having an input connected to said first preamplifier output, a high-pass filter passing audio frequencies above fifteen kilocycles and having an input connected to said second output, first and second outputs from said high-pass filter, a thirty kilocycle resonant amplifier having an input connected to one output of said high-pass filter and resonant to the thirty kilocycle carrier on said track from said crystal controlled oscillator, a frequency control discriminator having an output and having an input connected to the output of said resonant amplifier, a thirty kilocycle local oscillator having an output and having an input connected to the output of said discriminator to be controlled by said discriminator, a mixer having two inputs, one connected to the other output of said high-pass filter and the other input connected to the output of said local oscillator, an output on said mixer, first and second channel amplifiers each having an input and an output, means for connecting the input of said first channel amplifier to the output of said third low-pass filter, means for connecting the input of said second channel amplifier to the output of said mixer, and first and second loud speakers physically spaced apart substantially said given distance and connected respectively to the outputs of said first and second channel amplifiers.

References Cited in the file of this patent

UNITED STATES PATENTS

| | | |
|---|---|---|
| 2,352,696 | De Boer et al. | July 4, 1944 |
| 2,536,664 | Sinnett et al. | Jan. 2, 1951 |